Figure 1:
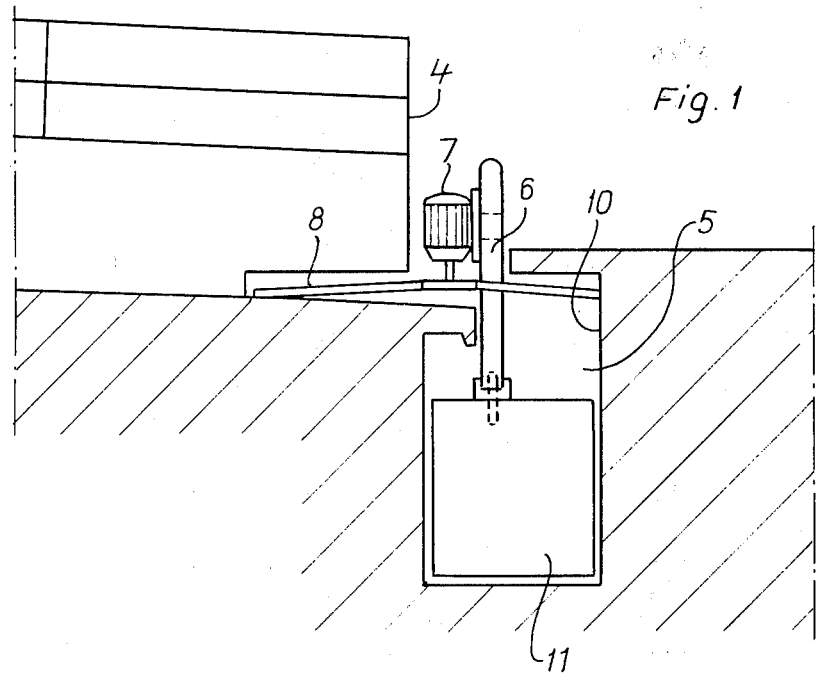

United States Patent [19]
Gallei

[11] 3,985,103
[45] Oct. 12, 1976

[54] MANURE REMOVER
[75] Inventor: Herbert Gallei, Wollersdorf, Austria
[73] Assignee: Alfa-Laval AB, Tumba, Sweden
[22] Filed: Mar. 17, 1975
[21] Appl. No.: 559,057

[52] U.S. Cl. .................................. 119/28; 119/27
[51] Int. Cl.² ........................................ A01J 1/00
[58] Field of Search ............... 119/28, 27, 16, 15, 119/14.03, 14.04, 20–22; 198/DIG. 18; 15/256, 87, 21 C, 21 D, 21 E, 111

[56] References Cited
UNITED STATES PATENTS
3,766,589  10/1973  Arenas .................................. 15/87
3,860,991  1/1975   Heidt .................................... 15/87

FOREIGN PATENTS OR APPLICATIONS
35,532  1/1926  Denmark .......................... 119/28

Primary Examiner—Louis G. Mancene
Assistant Examiner—Peter K. Skiff
Attorney, Agent, or Firm—Cyrus S. Hapgood

[57] ABSTRACT

A manure remover for stables, especially for pigs, with a plurality of stalls arranged along a manure channel, which stalls have a manure area, situated close to the manure channel, a rotary brush being arranged to be driven and to sweep over the surface of the manure area and to move along the row of stalls by means of a conveying device.

4 Claims, 2 Drawing Figures

U.S. Patent  Oct. 12, 1976  3,985,103

MANURE REMOVER

When removing manure from stables, the manure, collecting at the manure area of the different stalls, is usually conveyed manually in a manure channel, extending along the manure area, and the manure is pushed outwards by means of scrapers, guided in the manure channel. It is also already known to remove the manure from the manure area of the different stalls by means of scrapers acting on the manure area. Scrapers guided over the manure area are not only prone to damage, but they also constitute a risk of injury to the animals. Scrapers guided over the manure area have the disadvantage that the manure sticks to the manure area, and the sanitary conditions become impaired to such a degree that a complete cleaning of the stable is necessary. For this the animals then must be removed from the stalls. It is also already known to clean the grid above the manure channel by means of a cylindrical rotary brush with a horizontal axis of rotation.

It is the object of the invention to provide a manure remover which eliminates the disadvantages of the known devices and makes a completely automatic manure removal from the stable possible.

According to the present invention a rotary brush, which preferably is flat, is arranged to rotate about a vertical axis or about an axis, which inclines somewhat in relation to the vertical, which brush extends over the manure area of each stall as well as over the manure channel. The device according to the invention is simple and cheap and also ensures an especially thorough manure removal. Animals staying at the manure area during the manure removal are in no way subjected to injuries by the rotary brush. After a use of the present manure remover during a long time, very good sanitary conditions prevail in the stable, and in, for example, pig stables the heretofore usual complete cleaning was not necessary. Furthermore, experimental results have proved that animals in stables with the manure remover according to the invention were less susceptible to infectious diseases than animals in stables with the prior known manure removers.

In stables, in which the manure place of each stall is at the end adjacent the manure channel, by means of a wall free from uprights and in which the stalls are separated by means of walls arranged at right angles to the end wall, a part of the rotary brush extends, according to a preferred embodiment of the invention, below the end wall and also below the separation walls in the manure area. Thereby, all stalls in a row can be cleaned in one operation cycle. According to an additional embodiment, the points of the bristles of the rotary brush contact the side wall of the manure channel opposite to the manure area. Thereby, the rotary brush is cleaned continuously during the operation. Preferably, the rotary brush can be mechanically connected to a scraper, guided in the manure channel and being of a kind known per se, whereby the manure, supplied to the manure channel by the rotary brush, is discharged in one operation course from the stable. To advantage, a spraying device for liquid can be arranged above the brush. Cleaning of the disinfection liquids can be emitted from this spraying device.

Figure 2:
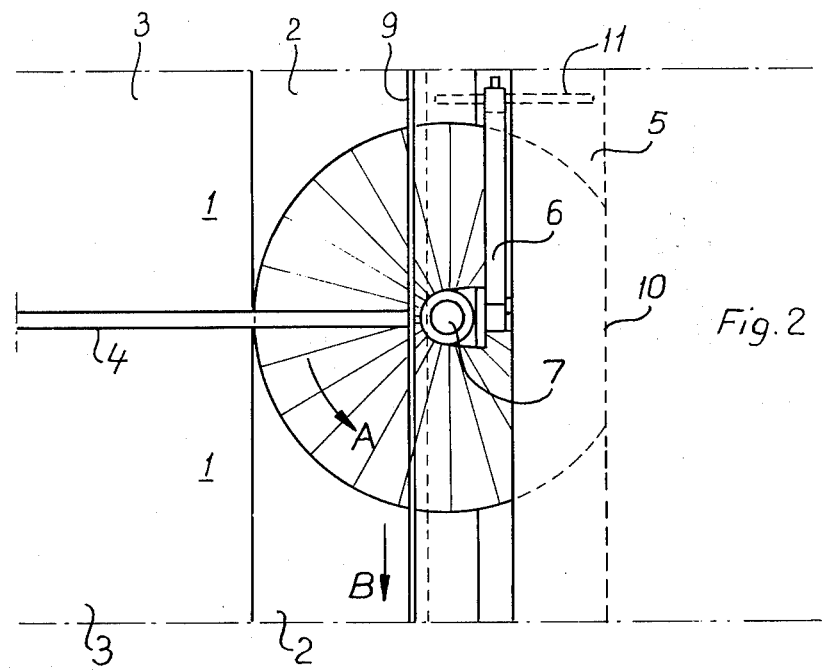

The invention will now be described more in detail below, reference being made to the accompanying drawing, in which FIG. 1 shows an elevational view, and FIG. 2 a plan view of an embodiment chosen by way of example.

In the drawing, two stalls 1 are shown separated by a wall 4. Each stall 1 has an area 3 for lying and eating and a manure area 2. The latter can be lower than the area 3. A manure channel 5, covered partially, runs along the row of stalls 1, and a scraper 11 is guided in this channel. The manure area 2 of each stall is confined at the side adjacent to the manure channel by an end wall 9, shown in FIG. 2, which is free from uprights. A carrier 6 for the scraper 11 carries a motor 7, which drives a relatively flat brush 8 with flexible bristles. This brush sweeps the manure areas and is pressed with its bristles against the side wall 10 of the manure channel 5. The bristles of the brush 8 are inclined in relation to the horizontal about 20°. The carrier 6 is driven along the manure channel by means of a chain (not shown) or directly by the motor 7.

The manure removal of the present invention operates in the following way: The rotary brush 8 is driven in the direction of the arrow A, and the carrier 6 with the scraper 11 and the brush 8 moves at the same time in the direction of the arrow B. Manure present at the manure areas 2 is fed by the brush into the channel 5 and is discharged outwards by the scraper 11. At the same time the bristles of the brush 8 are flexed against the side wall 10 of the channel 5 and are there freed from manure still sticking to the bristles. Preferably, a spraying device (not shown) is fixed to the carrier 6, and by means of this device water, possibly admixed with cleaning or disinfection agents, can be sprayed against the brush or directly against the manure areas.

What is claimed is:

1. In a manure remover for stables having a plurality of animal stalls arranged along a manure channel, which stalls have a manure area adjacent the manure channel, the improvement which comprises a substantially flat circular brush having generally horizontally directed bristles, said brush being rotatable about a generally vertical axis and mounted on a carrier arranged to be advanced along the manure channel, said brush extending over the manure channel and being arranged to sweep the manure areas of the stalls as it rotates and advances along the manure channel, and means for rotating said brush and advancing said carrier along said channel.

2. The manure remover of claim 1 wherein the stalls are separated by walls and include an end wall separating the manure areas of each stall from the manure channel and wherein the brush extends below the end wall and separating walls in the manure areas.

3. The manure remover of claim 2 wherein the manure channel is partly defined by a wall opposite the manure areas and wherein the brush contacts and flexes against said manure channel wall.

4. The manure removal of claim 1 wherein the carrier includes a scraper located in the manure channel which scraper acts in the manure channel as the carrier is advanced.

* * * * *